US012433349B1

(12) United States Patent
Schneider

(10) Patent No.: US 12,433,349 B1
(45) Date of Patent: Oct. 7, 2025

(54) SMART GARMENT

(71) Applicant: CCS CREATIONS LLC, Orlando, FL (US)

(72) Inventor: Cole Schneider, Orlando, FL (US)

(73) Assignee: CCS CREATIONS LLC, Orlando, FL (US)

( * ) Notice: Subject to any disclaimer, the term of this patent is extended or adjusted under 35 U.S.C. 154(b) by 360 days.

(21) Appl. No.: 18/130,370

(22) Filed: Apr. 3, 2023

Related U.S. Application Data

(63) Continuation-in-part of application No. 16/926,637, filed on Jul. 10, 2020, now abandoned, which is a (Continued)

(51) Int. Cl.

| | |
|---|---|
| ***G06F 1/16*** | (2006.01) |
| ***A41B 1/08*** | (2006.01) |
| ***A41D 1/00*** | (2018.01) |
| ***A41D 27/20*** | (2006.01) |
| ***H04R 1/02*** | (2006.01) |

(52) U.S. Cl.
CPC ................ *A41D 1/002* (2013.01); *A41B 1/08* (2013.01); *A41D 27/205* (2013.01); (Continued)

(58) Field of Classification Search
CPC .......................................................... G06F 1/16
See application file for complete search history.

(56) References Cited

U.S. PATENT DOCUMENTS 6,590,303 B1 7/2003 Austin
7,795,553 B2 9/2010 Weber
(Continued)

OTHER PUBLICATIONS

Digital Photo Frame, www.amazon.com/digital-electronics-picture, 8 pages, amazon web site, 2017/.
(Continued)

*Primary Examiner* — Jerry Wu
(74) *Attorney, Agent, or Firm* — Brian S. Steinberger; Hilary F. Steinberger; Steinberger IP Law

(57) ABSTRACT

The present invention provides a smart garment having a media player incorporated therein or attached thereto, and in some embodiments having a pouch or pocket for attaching the media player to the garment therein or directly attaching the media player to the garment. The pocket or pouch can be on one of the left or right breast pocket, the left or right sleeve, or the left or right hip portion of a shirt garment. The pocket can be sewn onto the shirt, or being one of the existing pockets of the shirt garment. Advantageously, the media player may be configured to store and play a media item or file associated with an image represented on the smart garment. The media item is a stored music segment and voice segment of a recorded song, the stored music segment and voice segment being limited to between approximately 10 seconds to approximately 30 seconds of the recorded song. An alarm unit may be incorporated into the player or be a separate unit thereto since the garment may be washed and dried by accident. The alarm unit may be activated by a lack of motion for a period of time, and having a protective layer thereon may degrade any music. The media player being inside of said garment and invisible outside thereof. A clip can attached the invention to a pocket on a garment, where a target on the clip allows access to activate playing the song segment.

3 Claims, 7 Drawing Sheets

Related U.S. Application Data continuation-in-part of application No. 16/746,851, filed on Jan. 18, 2020, now Pat. No. 11,049,524, and a continuation-in-part of application No. 16/055,042, filed on Aug. 4, 2018, now Pat. No. 10,613,580.

(60) Provisional application No. 62/605,498, filed on Aug. 16, 2017.

(52) U.S. Cl.
CPC ............. *A41D 27/208* (2013.01); *H04R 1/02* (2013.01); *H04R 2201/023* (2013.01)

(56) References Cited

U.S. PATENT DOCUMENTS

| | | | | |
|---|---|---|---|---|
| D650,355 | S | 12/2011 | Andre | |
| 8,934,226 | B2 | 1/2015 | Smith | |
| D750,617 | S | 3/2016 | Akana | |
| 9,578,384 | B2 | 2/2017 | Selim | |
| 2008/0083720 | A1 * | 4/2008 | Gentile .................... | A43B 3/35 219/211 |
| 2008/0137268 | A1 | 6/2008 | Mayette | |
| 2014/0282071 | A1 | 9/2014 | Trachtenberg | |
| 2015/0070340 | A1 | 3/2015 | Trachtenberg | |
| 2015/0143601 | A1 * | 5/2015 | Longinotti-Buitoni ...................... | A41D 13/1281 2/69 |

OTHER PUBLICATIONS

Segment Definition & Meaning, retrieved from https://dictionary.com/browse/segment, retrieved on Aug. 2, 2022, 2 pages.

McKinney, Kelsey, A hit song is usually 3 to 5 minutes long. Here's why., VOX, Jan. 30, 2015, 5 pages.

* cited by examiner

SMART GARMENT

CROSS REFERENCES TO RELATED APPLICATIONS

This application is a Continuation In Part (CIP) of U.S. patent application Ser. No. 16/926,637 filed Jul. 10, 2020, which is a Continuation In Part (CIP) of U.S. patent application Ser. No. 16/055,042 filed Aug. 4, 2018, now U.S. Pat. No. 10,613,580, which claims the benefit of priority to U.S. Provisional Patent Application 62/605,498 filed Aug. 16, 2017.

U.S. patent application Ser. No. 16/926,637 filed Jul. 10, 2020 is a Continuation In Part (CIP) of U.S. patent application Ser. No. 16/746,851 filed Jan. 18, 2020, now U.S. Pat. No. 11,049,524.

REFERENCE TO FEDERALLY SPONSORED RESEARCH

NA

DEVELOPMENT

NA

REFERENCE TO JOINT RESEARCH AGREEMENTS

NA

REFERENCE TO SEQUENCE LISTING

NA

BACKGROUND OF THE INVENTION

Field of Invention

The present invention relates generally to clothing, and, more particularly, relates to a garment with an electronic device therein, and, in great particularity, relates to clothing having a device therein that provides pre-programmed audio for entertainment.

Background of the Invention

Entertainment devices like audio players can be placed in clothing having pockets such as small pocket radios and players.

Several prior art devices can provide both audio and video. U.S. Pat. No. 8,934,226, titled "Mountable Device Having a Pivotable Input Device Support", issued Jun. 13, 2015, by Smith discloses a wall mountable computer system as noted in Col. 11, lines 9 to 42, having both video and audio support through numerous devices including being connected to the Internet. U.S. Pat. No. 9,578,384, entitled Systems and Method for Providing Video on Demand in an Intelligent Television", issued Feb. 21, 2017, by Flextronics discloses a table mounted television having user interface for video-on-demand (VOD) and the use of such. U.S. Patent Application Publication 2014/0282071, titled Systems and Methods for Distributing, Viewing, and Controlling Digital Art and Imaging, published Sep. 18, 2014, by Trachtenberg discloses a frame with a screen as would be provided by a tablet as discussed in paragraphs [0127] to [0129] where an additional controller is attached to the frame. U.S. Patent Application Publication 2015/0070340, entitled "Display Device for Displaying Digital Imaging", published Mar. 12, 2015, by Trachtenberg discloses a vertically mounted display screen with supporting computer system connected via the Internet to the Cloud. Further, a photo frame electronic video/audio player by Amazon supports pictures, videos, and audio and is known to one skilled in the art. Also see Wikipedia as to Bluetooth. These are incorporated by reference.

There is a need for a product which can be easily and flexibly incorporated into any garment and in an ergonomic position for activating the smart garment's functions. It is within this context that the present invention is provided.

SUMMARY OF THE INVENTION

The present invention provides a smart garment having a media player incorporated therein or attached thereto, and in some embodiments having a pouch for attaching the media player to the garment. Advantageously, the media player may be configured to store and play a media item or file associated with an image represented on the smart garment. An alarm unit may be incorporated into the player or be a separate unit thereto since the garment may be washed and dried by accident. The alarm unit may be activated by a lack of motion for a period of time, and may have a protective layer thereon within the pouch.

It is an object of the present invention to provide a media player on a garment and detachably connected to the garment of the present invention;

It is another object of the present invention to provide a media player having a wireless transceiver module configured to provide communication between a controller therein and one or more external devices. In response to a command from an external device the pre-set audio media item stored on the computer-readable medium may be replaced with a second audio media file;

It is a further object of the present invention to provide a computer-readable storage medium such as a TransFlash (TF) or SecureDigital (SD) card that may be removed from the audio media device. The audio media device may comprise a second activation mechanism for removing the TF/SD card;

It is still a further object of the present invention to provide a media player having a power module, a speaker module, an activation mechanism, a computer-readable medium, and a controller; wherein the controller of the audio media device is configured, in response to activation of the activation mechanism, to cause a pre-set audio media item stored on the computer-readable medium to be played through the speaker module;

It is still another object of the present invention to provide a media player being rechargeable;

It is still another object of the present invention to provide a In one embodiment, the garment includes a design, and the preset audio media item stored on the computer-readable medium is associated with the design; and It is still another object of the present invention is to provide a media player with a kit comprising an audio media device according to any of the embodiments described above and a fabric pocket holder configured to be attached to a garment and to hold the audio media device therein.

These and other objects, features, and advantages of the present invention will become more readily apparent from the attached drawings and the detailed description of the preferred embodiments, which follow.

BRIEF DESCRIPTION OF THE DRAWINGS

FIG. 11 illustrates a second version of the third embodiment in a closed position.

Like reference numerals refer to like parts throughout the several views of the drawings.

DETAILED DESCRIPTION AND PREFERRED EMBODIMENT

Figure 1:
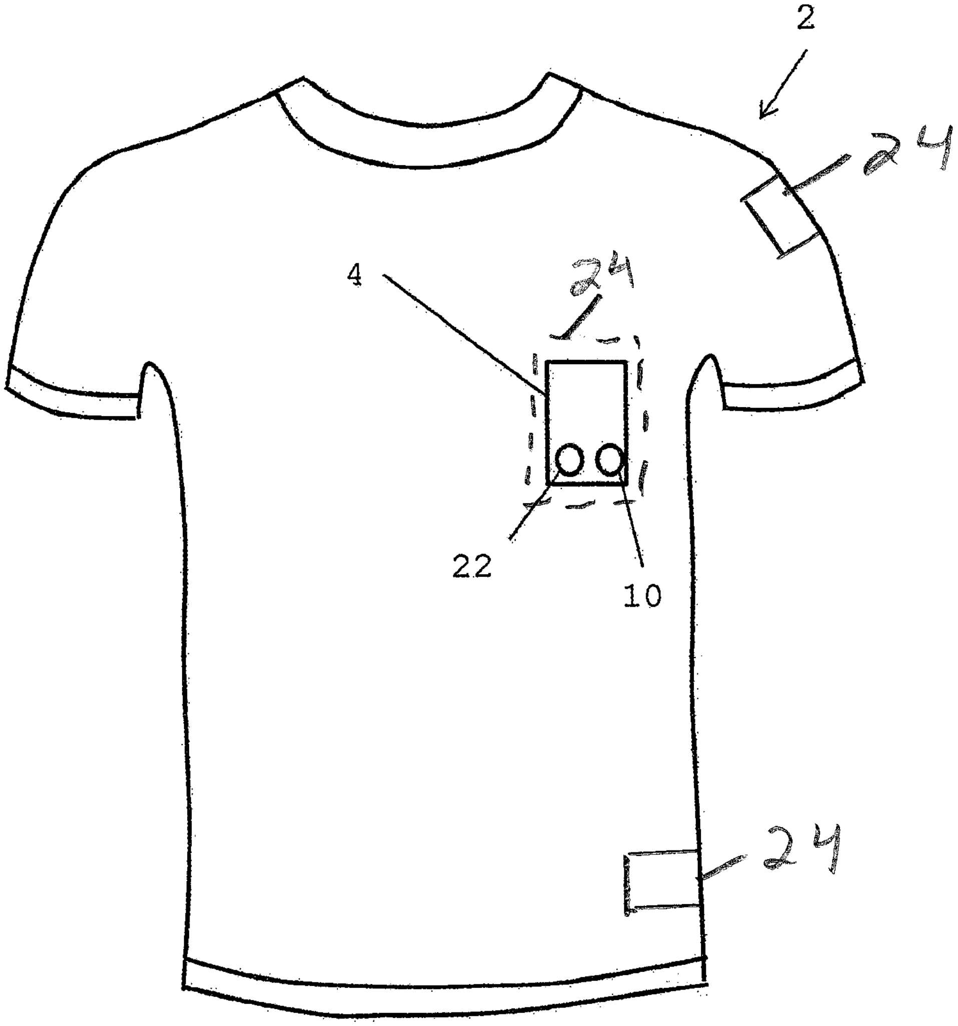
FIG. 1 illustrates a front view of a smart garment according to an embodiment of the present invention wherein the audio media player comprises first and second activation mechanisms.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of parts will be described.

2 garment (shirt)
4 audio media player
6 power module
8 speaker module
10 first activation button
11 design image
22 second activation button
14 player enclosure
15 housing
16 sealed plastic pouch
17 headphone, set of earphones
18 USB port/USB-C interface
19 lights
24 fabric pouch
120 computer readable medium
140 controller
150 motion sensor
190 wireless module
200 clip on embodiment
205 base
210 clip
250 screen Referring to FIG. 1, the present entertainment system comprises a front view of a smart garment 2 according to the present invention shown wherein a media player 4 is attached to the garment 2 having a first 10 and second 12 activation devices or buttons. The media player 4 can be placed in a conventional pocket or in an enclosure 14, FIG. 2, that can be removably sealed by hook and loop means and further include a sealed plastic pouch 16 about the player 4. The enclosure 14 may be located on the inside of a shirt. The conventional pocket 16 has normally an open top. The player enclosure 14 prevents the player 4 from falling out when the user is being active such as playing sports. The pouch 16 will further prevent water damage, but be thin enough to allow operation of the player 4 and allow music to come therefrom.

Figure 4:
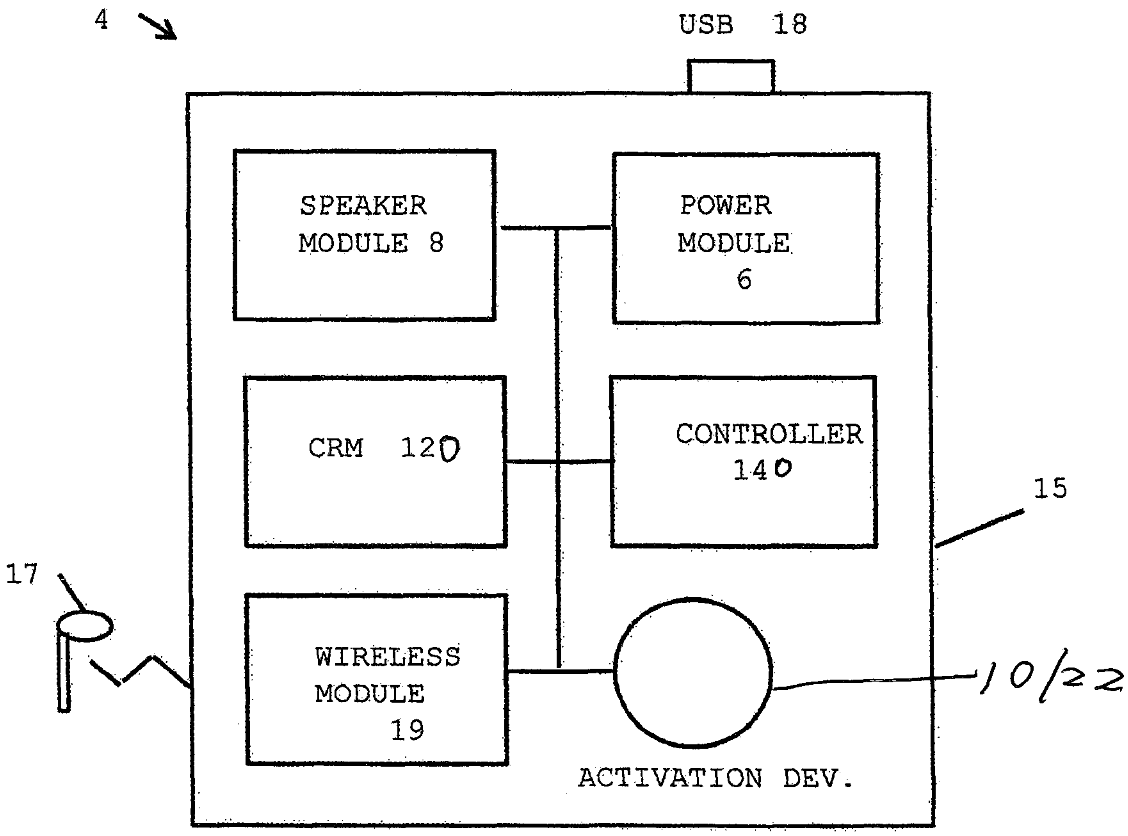
FIG. 4 illustrates by block diagram electrical functions within the media player.

Generally, the audio media device or player 4, referring to FIG. 4, will comprise a power module 6, a speaker module 8, a computer readable medium 120, a controller 140, a wireless module 190 and one or more activation mechanisms 10,22 such as push buttons having different functions. The various modules of the audio media player 4 can be connected via a PCB board within a housing 15 or alternatively could be sewn or otherwise attached into the fabric of the smart garment 2 separately. Also included in FIG. 4 are a set of headphone(s) or earphone(s) 17 plugged in directly or with Bluetooth technology for wireless use.

The computer-readable medium 120 generally has a preset audio media file pre-loaded into its memory. In the present example, the first activation mechanism 10, illustrated in this case is a push button with functions for causing the audio media player 4 to play the preset media file stored on its computer-readable medium 120. The audio media file can be be a segment of a song. The segment would be a short part of a song that includes catchy part and hook chorus of the song. The segment would include lyrics and music from the song. The segment would be between approximately 10 seconds to approximately 30 seconds in length. And in some examples the song played may be associated with an image such as waves 11, FIG. 2, or design on the garment 2.

According to vox.com, the average length of a "hit song is usually 3 to 5 minutes long. See McKinney, Kelsey, A hit song is usually 3 to 5 minutes long. Here's why. Vox.com Jan. 30, 2015, which is incorporated by reference. As such, the invention is limited to only playing a substantially short version of the musics and lyrics of a recorded song.

Figure 6:
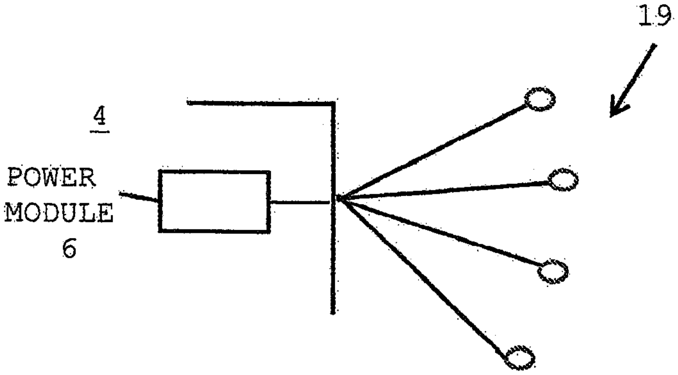
FIG. 6 illustrates multiple wires providing electrical energy to LED lights located in the garment.

Optionally, the activation button 10 may also power a set of lights 19, FIG. 6, attached to the smart garment, and the first activation button 10 can simultaneously activate the lights 19 to create a show effect for a visual effect.

Although the illustrated activation button is a push button type, it should be recognized that any other type of suitable activation mechanism could be incorporated into the invention.

The computer-readable medium 120 can either be integrated or take the form of a removable SD/TF card. In the present example, the computer readable medium is in the form of a removable SD/TF card and may be ejected from the device using the second activation button 22.

As shown, in the present example both the first and second activation buttons 10 and 12 are located on the audio media player 4 itself. This provides benefits in that a wearer can easily locate the activation mechanisms by feeling the device pressed against their body. However, as will be described below, other implementations are possible.

Figure 2:
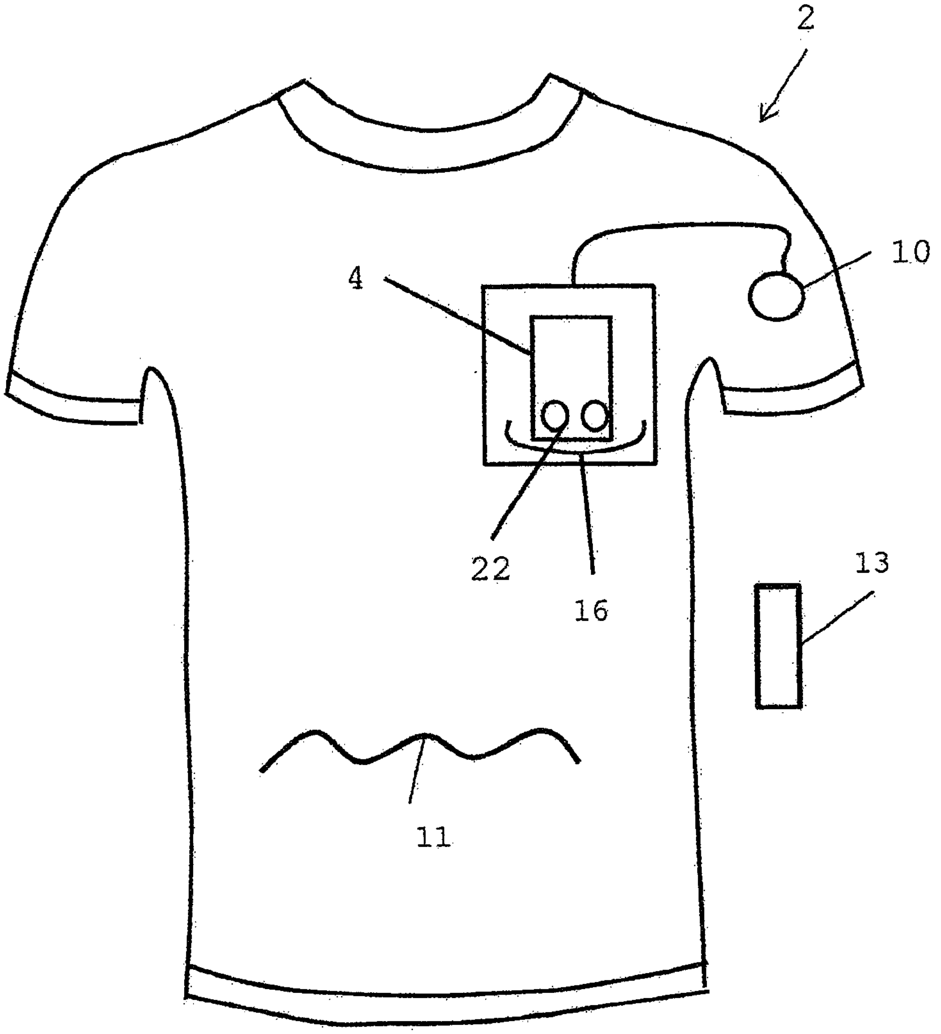
FIG. 2 illustrates a front view of a smart garment according to the present invention wherein the media player comprises a first activation mechanism attached by a wire to enable the activation location to be in a different place to the audio media player.
Figure 3:
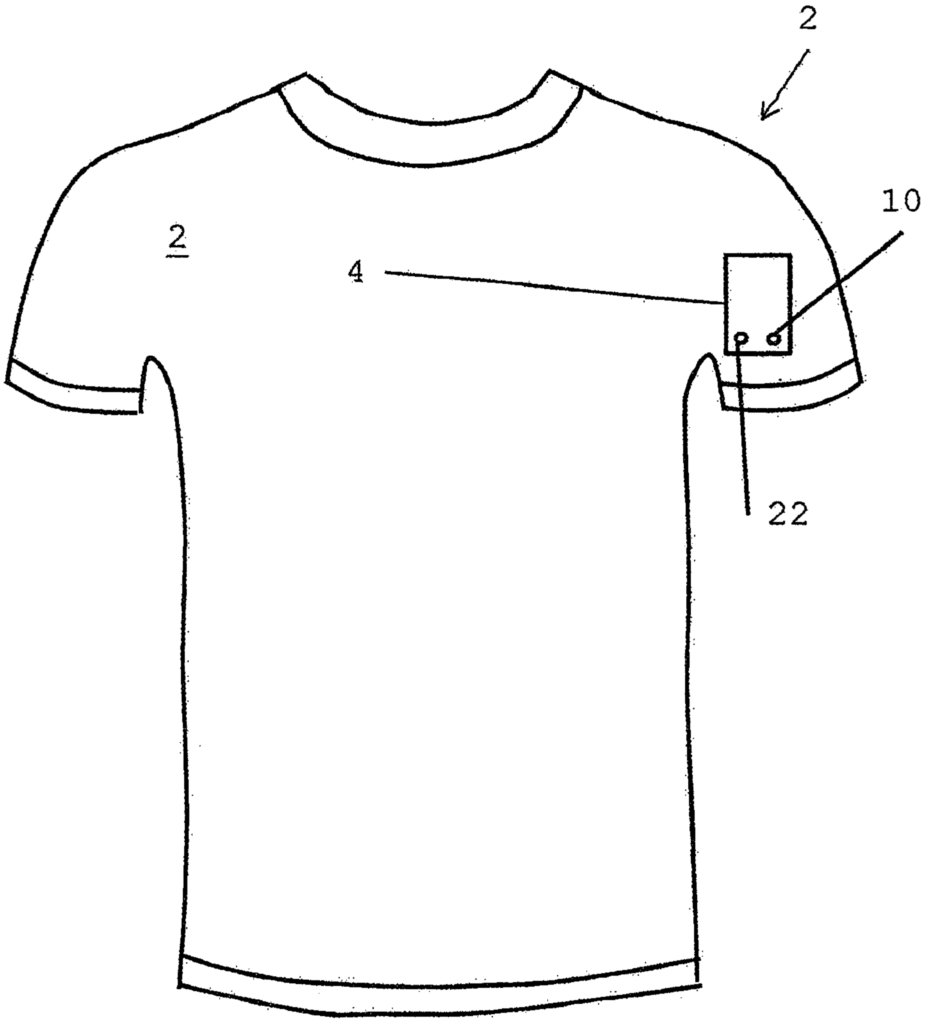
FIG. 3 is an embodiment where the media player is located on an arm within a pouch.

Referring to FIG. 2, a front view of another smart garment 2 according to a second embodiment of the present invention is shown wherein the media player 4 comprises a first activation mechanism 10 attached by a wire to enable the activation mechanism to be in a location different than the audio media player 4. Further a smart phone 13 can communicate to the media player 4 via app through a Blue Tooth connection for controlling the operation of such.

In the present example, the computer-readable medium 120 of the audio media device 4 is integrated, for example, on a PCB board within a protective housing 16. This has the benefit of simplifying the circuitry and not requiring a second activation mechanism for ejecting a chip which can be removal manually.

Furthermore, in the present example, FIG. 2, the first activation mechanism 10 is not located on the audio media device 4 itself, but is attached thereto by a wire, and is instead located in a position which is more ergonomic for a user to activate it. Alternatively, the first activation mechanism 10 could be completely separate to the audio media device and communicate with the device using wireless signals between a wireless module 19 located on the audio media player 4 and itself, such as Bluetooth or NFC technology. The details of such methods are well understood by persons skilled in the art and will not be described in detail here.

Optionally, both embodiments may further incorporate wireless module 190 in order to exchange the preset audio media file of the device with another, or to otherwise enable control of the smart garment 2 using external computing devices.

Furthermore, although FIGS. 1 and 2 both illustrate the smart garment 2 of the present invention as a t-shirt, it should be understood that the principles of the invention can be applied equally well to any garment, including caps, sweatshirts, pants, and the like.

The power module 6 of the audio media player 4 can generally be rechargeable, in which case the audio media player 4 also includes a charging port 18, FIG. 4. However alternatively the power module may not be rechargeable, instead incorporating disposable batteries for example, in which case no charging port is included or it can be recharged wirelessly.

Figure 5:
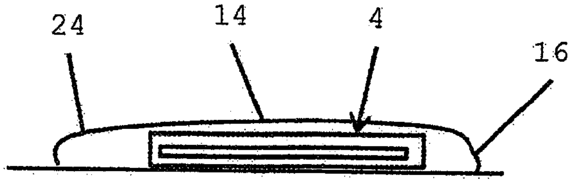
FIG. 5 illustrates by a partial view a pouch on a garment.

The audio media device of the present invention can be held in a pocket which is integrated with the garment, or can be part of a kit comprising the audio media device and a fabric pouch 24, FIG. 5, which a user or manufacturer can sew into any position on any garment they wish. The pouch for holding the media player or the media player can be attached separately by fabric glue, Velcro®, buttons or zippers to a garment item. This has the advantage of providing more options for customization.

Figure 7:
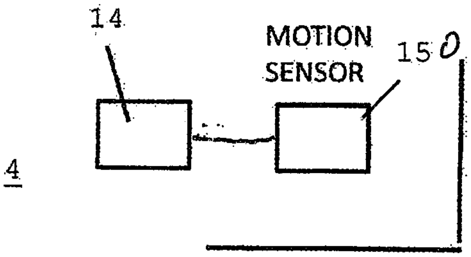
FIG. 7 illustrates a partial view of the media schematic having a motion sensor therein.

Preferably, the electronic components of the smart garment 2 are hidden from view while the garment is worn, and can be easily taken out to allow the garment to be washed. In this regard, a motion sensor 150, FIG. 7, can alert the user if the player 4 is not moved for a given period of time and thus remove the player 4.

As mentioned above, although not illustrated, the smart garment 2 can further comprise a set of lights 19 connected to the audio media device power module 6. FIG. 6, which are activated simultaneously to the playing of the audio media item through the speaker module 8, thereby adding to the entertainment. The lights 19 may be for example a series of LED lights attached to the device by wires.

The controller 140 and the wireless transceiver module 160 can enable wireless communications for the transfer of data to and from the audio media device 4. The controller 140 can include a plurality of such communication chips. For instance, a first communication chip can be dedicated to shorter range wireless communications such as Wi-Fi and Bluetooth, and a second communication chip may be dedicated to longer range wireless communications such as GPS, EDGE, GPRS, CDMA, WiMAX, LTE, EV-DO, and others.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wide area (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2006 may operate in accordance with a Global System for Mobile Communications (GSM), General Packet Radio Service (GPRS), Universal Mobile Telecommunications System (UMTS), High Speed Packet Access (HSPA), Evolved HSPA (E-HSPA), or LTE network. The communication chip 2006 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2006 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 2006 may operate in accordance with other wireless protocols in other embodiments.

In summary, an entertainment system comprises a garment, worn by a user, said garment having thereon a pouch, said pouch having a closable opening; and a media player, said media player being positioned in said pouch, said media player comprising: a power module (6); a speaker module (8); an activation mechanism (10); a computer-readable medium (120); and a controller (140); wherein said controller of said media player is configured in response to activation of said activation mechanism, to cause a pre-set audio media file stored on the computer-readable medium to be played through said speaker module. The entertainment system further comprising: a wireless transceiver module (160) configured to provide communication between the controller and one or more external devices such as a smartphone; wherein in response to a command from said external device a pre-set audio media file stored on said computer-readable medium is replaced with a second audio media file via a Blue Tooth connection. wherein said power module is rechargeable and further comprises at least a charging port (18); further including said garment having a design, and wherein said pre-set audio media file stored on said computer-readable medium is associated with said design on said garment; wherein said garment includes a fabric pocket (20) for holding said audio media device on an inner surface of the garment; wherein said audio media file is a music segment; wherein said audio media item is a voice segment; wherein said computer-readable storage medium is a TransFlash (TF) or SecureDigital (SD) card that may be removed from said media player; wherein said audio media player further comprises a second activation mechanism (22) for removing the TF/SD card; further including a thin plastic covering for said media player while in said pocket to prevent water damage; further including a motion sensor for detecting inactivity for alerting the user to remove said media player before cleaning; and further including one or more lights attached to said garment and controlled by said media player.

Although the garment and/or pouch is referred to as being a fabric, the material can be an alternative such as any other type of pliable and flexible material, and the like.

While the above embodiments show the location of the invention on a breast pocket area of a shirt in FIG. 1, the invention can be located in other locations such as the upper outer sleeve and/or the hip area of a shirt. The location of the pocket area can be on the upper right or upper left breast portion of the shirt. The location of the pocket area can be on the upper right or upper left upper sleeve portion of the shirt. The location of the pocket area can be on the right or left hip area of the shirt. Additionally, the location of the pocket can be on the front or back of the shirt garment.

Although the invention describes the invention has being sewn onto the garment, the invention can rest inside of an existing pocket on a shirt, such as in a breast located pocket, upper.

Figure 8:
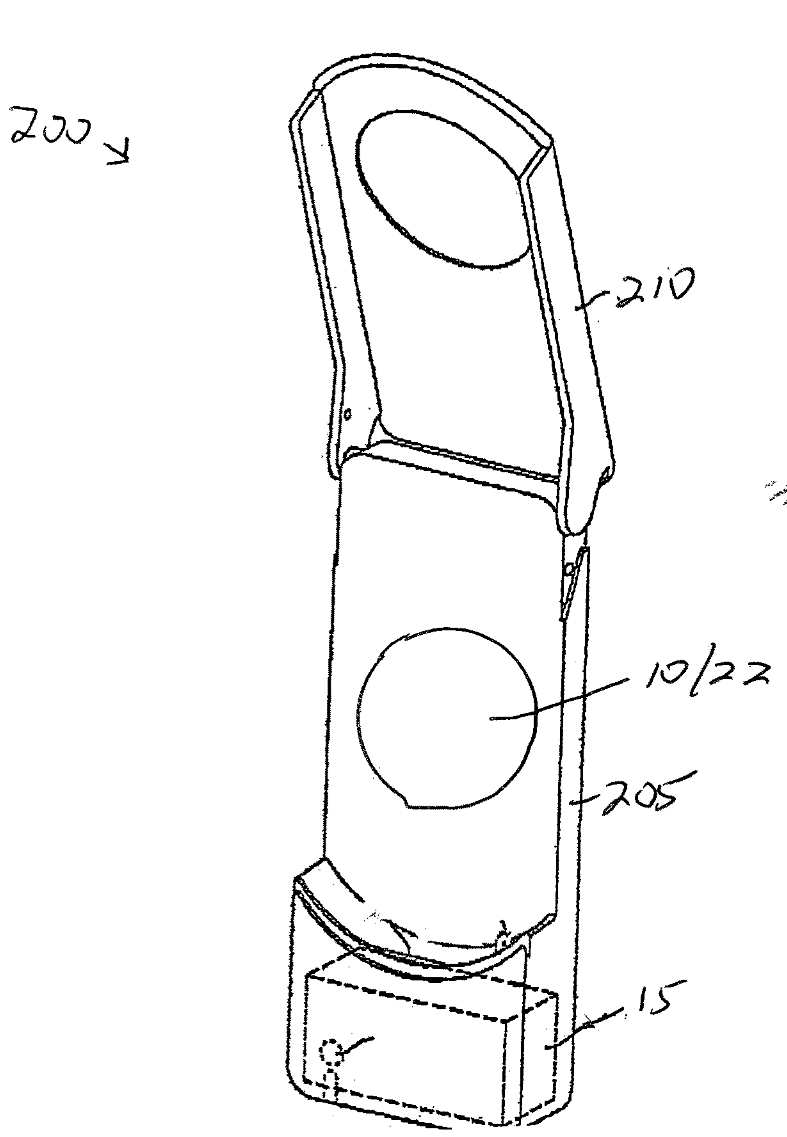
FIG. 8 illustrates a perspective front view of a third embodiment of the audio player with clip in an open position.

FIG. 8 illustrates a perspective front view of a third embodiment 200 of the audio player 4 of the previous embodiments with clip 210 in an open position.

Figure 9:
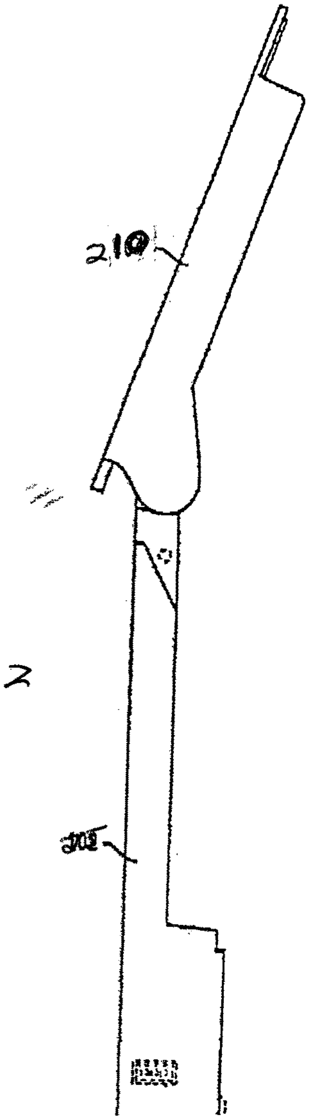
FIG. 9 illustrates a perspective side view of the third embodiment of FIG. 8.

FIG. 9 illustrates a perspective side view of the third embodiment 200 of FIG. 8.

Figure 10:
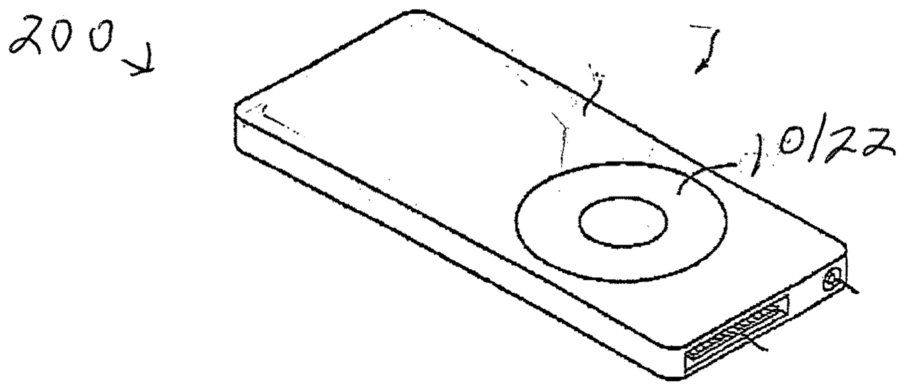
FIG. 10 illustrates a upper front perspective view of the third embodiment in a closed position.
Figure 1I:
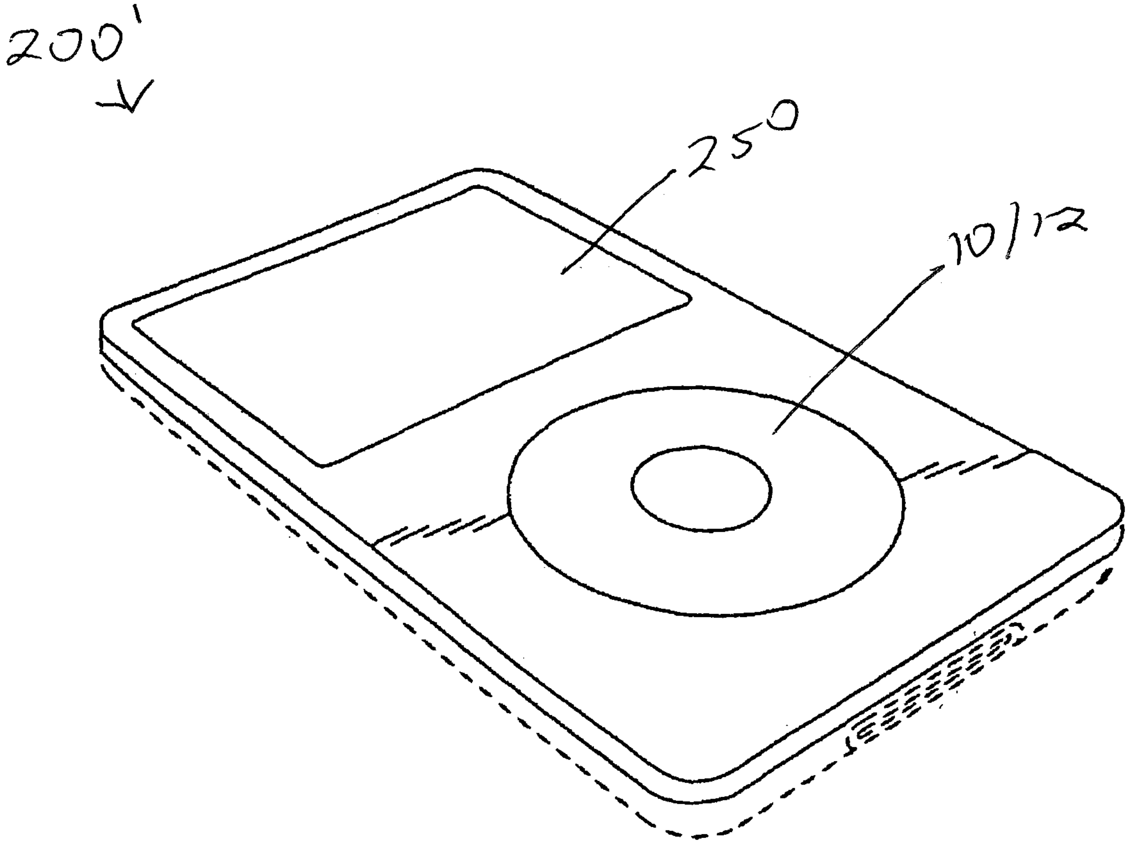

FIG. 10 illustrates a upper front perspective view of the third embodiment 200 in a closed position.

Referring to FIGS. 8-11, these embodiments can inspirate technology from the IPOD NANO® from Apple Inc. and in U.S. Pat. No. 7,795,553 to Weber et al., D650,355 to Andre et al. D750,617 to Akana et al, which are all incorporated by reference. These embodiments can further incorporate the technology for personal MP3 wireless audio players, such as in U.S. Pat. No. 6,590,303 to Austin et al. and from U.S. Published Patent Application 2008/0137268 to Mayette et al., which are both incorporated by reference.

Referring to FIGS. 1-10, the third embodiment 200 can include a base 205 that supports the activation switches/buttons 10/22 and the housing 15. A clip 210 can attach out of a pocket such as the different pockets on a shirt garment 2, where the clip remains exposed outside of the pocket. The circular opening the the clip 210 can be a target area for allowing access to the activation buttons 10, 22. Alternatively the circular opening the the clip 210 can have a pliable material with indicia such as terms such as but not limited to TOUCH TEE SHIRT™, and/or design images, such as but not limi limited to target indicia such as but not limited to a bullseye and/or other designs related to the song segment to be played.

FIG. 11 illustrates a second version of the third embodiment 200' in a closed position, with the addition of a small display screen 250.

The term "approximately"/"approximate" can be +/−10% of the amount referenced. Additionally, preferred amounts and ranges can include the amounts and ranges referenced without the prefix of being approximately.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A shirt entertainment system for playing a song segment by a push button, said entertainment system consisting of:

a shirt garment having a front side and a back side, a left arm and a right arm, said shirt garment capable of being worn by a user, said garment including a closed pocket or pouch on one of a breast location, the left arm and the right arm of said shirt garment, a location on the front side of the shirt garment, a location on the rear side of the shirt garment, a left hip and a right hip of the shirt garment, the closed pocket or pouch being closed by a closure selected from the group consisting of fabric glue, hook and loop means, buttons, and a zipper;

a media player, said media player being positioned inside of said closed pocket or pouch, said media player comprising:

a power module;

a speaker module;

one single activation mechanism having one push button accessible through the pouch or pouch;

a computer-readable medium with a pre-set audio media file stored on the computer readable medium, the pre-set audio media file is a stored music segment and voice segment of a recorded song, the stored music segment and voice segment being limited to between approximately 10 seconds to approximately 30 seconds of the recorded song;

a controller;

a wireless transceiver module configured to provide communication between the controller and one or more external devices that includes a smartphone operating wirelessly, wherein in response to a command from said external device the pre-set audio media file stored on said computer-readable medium is replaced with a second audio media file via a wireless-connection, wherein said power module is rechargeable and further comprises at least a USB charging port; and a thin plastic covering for said media player while in said closed pocket or pouch to prevent water damage, wherein said controller of said media player is configured in response to activation of said activation mechanism through the pocket or pouch, to cause the pre-set audio media file stored on the computer-readable medium to be played through said speaker module, wherein said media player inside the pocket or pouch with the one single activation mechanism is not visible from outside of the shirt garment, and wherein activation of the one push button causes the stored music and voice segment of the song to be played once on the speaker module; and a target of visible indicia on the closed pocket or pouch, over the one push button for accessing the activation mechanism which, the visible target indicia selected from at least one of words TOUCH TEE SHIRT, a bullseye and a design related to the song segment being played.

2. A shirt entertainment system for playing a song segment by a push button, said entertainment system consisting of:

a shirt garment having a front side and a back side, said shirt garment capable of being worn by a user, said garment including a closed pocket or pouch on one of a breast location of said shirt garment, a location on the front side of the shirt garment, a location on the back side of the shirt garment, a left hip and a right hip of the shirt garment, the closed pocket or pouch being closed by a closure selected from the group consisting of fabric glue, hook and loop means, buttons, and a zipper;

a media player, said media player being positioned inside of said pocket or pouch, said media player comprising:

a power module;

a speaker module;

one single activation mechanism having one push button accessible through the pouch or pouch;

a computer-readable medium with a pre-set audio media file stored on the computer readable medium, the pre-set audio media file is a stored music segment and voice segment of a recorded song, the stored music segment and voice segment being limited to between approximately 10 seconds to approximately 30 seconds of the recorded song;

a controller;

a wireless transceiver module configured to provide communication between the controller and one or more external devices that includes a smartphone operating wirelessly, wherein in response to a command from said external device the pre-set audio media file stored on said computer-readable medium is replaced with a second audio media file via a wireless-connection, wherein said power module is rechargeable and further comprises at least a USB charging port; and a thin plastic covering for said media player while in said closed pocket or pouch to prevent water damage, wherein said controller of said media player is configured in response to activation of said activation mechanism through the pocket or pouch, to cause the pre-set audio media file stored on the computer-readable medium to be played through said speaker module, wherein said media player inside the pocket or pouch with the one single activation mechanism is not visible from outside of the shirt garment, and wherein activation of the one push button causes the stored music and voice segment of the song to be played once on the speaker module; and a target of visible indicia on the closed pocket or pouch, over the one push button for accessing the activation mechanism, the visible target indicia selected from at least one of words TOUCH TEE SHIRT, a bullseye and a design related to the song segment being played.

3. A T-shirt entertainment system for playing a song segment by a push button, said entertainment system consisting of:

a T-shirt garment having a front side and a back side, a left arm and a right arm, said shirt garment capable of being worn by a user, said garment including a closed pocket or pouch on one of a breast location, the left arm and the right arm of said T-shirt garment, a location on the front side of the T-shirt garment, a location on the rear side of the T-shirt garment, a left hip and a right hip of the T-shirt garment, the closed pocket or pouch being closed by a closure selected from the group consisting of fabric glue, hook and loop means, buttons, and a zipper;

a media player, said media player being positioned inside of said pocket or pouch, said media player comprising:

a power module;

a speaker module;

one single activation mechanism having one push button accessible through the pouch or pouch;

a computer-readable medium with a pre-set audio media file stored on the computer readable medium, the pre-set audio media file is a stored music segment and voice segment of a recorded song, the stored music segment and voice segment being limited to between approximately 10 seconds to approximately 30 seconds of the recorded song;

a controller;

a wireless transceiver module configured to provide communication between the controller and one or more external devices that includes a smartphone operating wirelessly, wherein in response to a command from said external device the pre-set audio media file stored on said computer-readable medium is replaced with a second audio media file via a wireless-connection, wherein said power module is rechargeable and further comprises at least a USB charging port; and a thin plastic covering for said media player while in said pocket or pouch to prevent water damage, wherein said controller of said media player is configured in response to activation of said activation mechanism through the pocket or pouch, to cause the pre-set audio media file stored on the computer-readable medium to be played through said speaker module, wherein said media player inside the pocket or pouch with the one single activation mechanism is not visible from outside of the T-shirt garment, and wherein activation of the one push button causes the stored music and voice segment of the song to be played once on the speaker module; and a target of visible indicia on the closed pocket or pouch, over the one push button for accessing the activation mechanism, the visible target indicia selected from at least one of words TOUCH TEE SHIRT, a bullseye and a design related to the song segment being played.

* * * * *